US010572867B2

(12) United States Patent
Etchegoyen

(10) Patent No.: US 10,572,867 B2
(45) Date of Patent: Feb. 25, 2020

(54) RENEWABLE RESOURCE DISTRIBUTION MANAGEMENT SYSTEM

(71) Applicant: Uniloc Luxembourg S.A., Luxembourg (LU)

(72) Inventor: Craig S. Etchegoyen, Newport Beach, CA (US)

(73) Assignee: Uniloc 2017 LLC, Wilmingon, DE (US)

( * ) Notice: Subject to any disclaimer, the term of this patent is extended or adjusted under 35 U.S.C. 154(b) by 580 days.

(21) Appl. No.: 13/707,454

(22) Filed: Dec. 6, 2012

(65) Prior Publication Data

US 2013/0218755 A1     Aug. 22, 2013

Related U.S. Application Data

(60) Provisional application No. 61/601,337, filed on Feb. 21, 2012.

(30) Foreign Application Priority Data

Apr. 24, 2012   (AU) .................... 2012100463

(51) Int. Cl.
*G06Q 20/22*    (2012.01)
(52) U.S. Cl.
CPC .................... *G06Q 20/22* (2013.01)
(58) Field of Classification Search
CPC ...... G06Q 20/10; G06Q 20/34; G06Q 20/102; G06Q 20/02; G06Q 20/12; G06Q 20/322;
(Continued)

(56) References Cited

U.S. PATENT DOCUMENTS

| 4,704,610 A | 11/1987 | Smith et al. |
| 5,019,813 A | 5/1991 | Kip et al. |

(Continued)

FOREIGN PATENT DOCUMENTS

| EP | 1 202 494 | 5/2002 |
| EP | 1 670 188 | 6/2006 |

(Continued)

OTHER PUBLICATIONS

Angha et al.; "Securing Transportation Network Infrastructure with Patented Technology of Device Locking Developed by Uniloc USA," http://www.dkassociates.com/admin/paperfile/ITS%20World%20Paper%20Submission_Uniloc%20_2_.pdf; Oct. 24, 2006.

(Continued)

*Primary Examiner* — Elda G Milef
(74) *Attorney, Agent, or Firm* — Sean D. Burdick

(57) ABSTRACT

Energy resource dispensing terminals can be added one-at-a-time to a wide area resource distribution system very easily where needed as needed. Each terminal can dispense any of a number of types of energy resources such as electricity, compressed hydrogen, compressed air, and waste vegetable oil. The energy dispensing terminal includes a terminal control computer that interacts with customer computing devices, such as personal, portable computing devices or onboard computers installed in vehicles to effect negotiation and fulfillment of energy resource purchase transactions. A resource sharing server facilitates such transactions by maintaining and verifying identities of customers and sellers along with financial account information such that a registered customer can purchase energy resources from any seller registered with the same resource sharing server.

4 Claims, 7 Drawing Sheets

(58) Field of Classification Search
CPC .... G06Q 20/405; G06Q 20/023; G06Q 20/20;
G06Q 20/22; G06Q 20/325; G06Q 20/40;
G06Q 20/4014; G06Q 20/04; G06Q
20/327; G06Q 30/0601; G06Q 20/027;
G06Q 20/06; G06Q 20/085; G06Q 20/18;
G06Q 20/202; G06Q 30/04; G06Q
30/0605; G06Q 30/0641; G06Q 30/0259;
G06Q 30/0261; G06Q 30/0267; G06Q
30/06; G06Q 20/401; G06Q 20/204;
G06Q 20/3278; G06Q 50/06; G06Q
30/00; G06Q 30/0609; H04W 88/08;
H04W 88/02; H04W 72/0453; H04W
72/048; H04W 12/06; H04W 88/04;
G07F 15/001; G07F 17/0014
USPC .......................................................... 705/39
See application file for complete search history.

(56) References Cited

U.S. PATENT DOCUMENTS

| | | |
|---|---|---|
| 5,327,066 A | 7/1994 | Smith |
| 5,852,724 A | 12/1998 | Glenn, II et al. |
| 6,098,106 A | 8/2000 | Philyaw et al. |
| 6,173,311 B1 | 1/2001 | Hassett et al. |
| 6,202,170 B1 | 3/2001 | Busschbach et al. |
| 6,463,078 B1 | 10/2002 | Engstrom et al. |
| 6,868,083 B2 | 3/2005 | Apostolopous et al. |
| 6,940,422 B1 | 9/2005 | Bachelder et al. |
| 6,967,592 B2 | 11/2005 | Bell et al. |
| 7,117,526 B1 | 10/2006 | Short |
| 7,327,280 B2 | 2/2008 | Bachelder et al. |
| 7,698,416 B2 | 4/2010 | Potti et al. |
| 7,765,328 B2 | 7/2010 | Bryers et al. |
| 8,205,790 B2 | 6/2012 | Perrella et al. |
| 8,249,028 B2 | 8/2012 | Porras et al. |
| 2002/0066041 A1 | 5/2002 | Lemke |
| 2002/0112186 A1 | 8/2002 | Ford et al. |
| 2003/0126240 A1 | 7/2003 | Vosseler |
| 2003/0163734 A1 | 8/2003 | Yoshimura et al. |
| 2003/0188001 A1 | 10/2003 | Eisenberg et al. |
| 2003/0217289 A1 | 11/2003 | Ammon et al. |
| 2003/0236880 A1 | 12/2003 | Srivastava et al. |
| 2004/0030912 A1 | 2/2004 | Merkle et al. |
| 2004/0038716 A1 | 2/2004 | Gass |
| 2004/0054569 A1 | 3/2004 | Pombo et al. |
| 2004/0107219 A1 | 6/2004 | Rosenberger |
| 2004/0143746 A1 | 7/2004 | Ligeti et al. |
| 2004/0148397 A1 | 7/2004 | Aronoff et al. |
| 2004/0166818 A1 | 8/2004 | Karlsson |
| 2004/0187018 A1 | 9/2004 | Owen et al. |
| 2004/0196162 A1 | 10/2004 | Brooke |
| 2005/0055552 A1 | 3/2005 | Shigeeda |
| 2005/0172161 A1 | 8/2005 | DeLaCruz et al. |
| 2005/0192832 A1* | 9/2005 | Call .................. G06Q 10/00 235/381 |
| 2005/0264431 A1 | 12/2005 | Bachelder |
| 2006/0095199 A1 | 5/2006 | Lagassey |
| 2006/0130135 A1 | 6/2006 | Krstulich et al. |
| 2006/0161914 A1 | 7/2006 | Morrison et al. |
| 2006/0166656 A1 | 7/2006 | Klicpera et al. |
| 2006/0277596 A1 | 12/2006 | Calvert et al. |
| 2007/0025245 A1 | 2/2007 | Porras et al. |
| 2007/0025265 A1 | 2/2007 | Porras et al. |
| 2007/0061871 A1 | 3/2007 | Simpkins et al. |
| 2007/0143001 A1 | 6/2007 | Park et al. |
| 2007/0198850 A1 | 8/2007 | Martin et al. |
| 2007/0219917 A1 | 9/2007 | Liu et al. |
| 2008/0074289 A1 | 3/2008 | Sauder et al. |
| 2008/0080750 A1 | 4/2008 | Bee et al. |
| 2008/0084877 A1 | 4/2008 | Brzozowski |
| 2008/0175235 A1 | 7/2008 | Frifeldt |
| 2008/0298595 A1 | 12/2008 | Narayanan et al. |
| 2009/0051568 A1 | 2/2009 | Corry et al. |
| 2009/0059823 A1 | 3/2009 | Bolduc et al. |
| 2009/0158396 A1 | 6/2009 | Baum et al. |
| 2009/0260064 A1 | 10/2009 | McDowell et al. |
| 2009/0292816 A1 | 11/2009 | Etchegoyen et al. |
| 2010/0057703 A1 | 3/2010 | Brandt et al. |
| 2010/0182918 A1 | 7/2010 | Clevy et al. |
| 2010/0208899 A1 | 8/2010 | Kasargod et al. |
| 2010/0281261 A1* | 11/2010 | Razzell ............... H04L 63/0492 713/171 |
| 2011/0179176 A1 | 7/2011 | Ravichandran et al. |
| 2011/0215158 A1 | 9/2011 | Kargl et al. |
| 2011/0238581 A1* | 9/2011 | Severson .............. G06Q 20/04 705/67 |
| 2012/0214416 A1 | 8/2012 | Kent et al. |
| 2012/0216262 A1 | 8/2012 | Bardsley et al. |
| 2012/0271686 A1* | 10/2012 | Silverman .................... 705/14.1 |
| 2013/0159701 A1 | 6/2013 | Phillips, II et al. |

FOREIGN PATENT DOCUMENTS

| | | |
|---|---|---|
| EP | 1 912 413 | 4/2008 |
| WO | WO 2001/055876 | 8/2001 |
| WO | WO 2004/023620 | 3/2004 |
| WO | WO 2005/094544 | 10/2005 |
| WO | WO 2004/102881 | 11/2005 |
| WO | WO 2006/138393 | 12/2006 |
| WO | WO 2007/060516 | 5/2007 |
| WO | WO 2007/022134 | 7/2007 |
| WO | WO 2008/004755 | 1/2008 |
| WO | WO 2008/118074 | 10/2008 |
| WO | WO 2009/009866 | 1/2009 |

OTHER PUBLICATIONS

Econolite and Uniloc Partner to Bring Unmatched Infrastructure Security to Advanced Traffic Control Networks with Launch to StrongPoint; http://www.econolite.com/docs/press/20080304_Econolite_StronPoint.pdf; Mar. 4, 2008.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Lai et al., "Context-aware Multimedia Streaming Service for Smart Home," The International Conference on Mobile Technology, Applications & Systems 2008 (Mobility Conference), Sep. 10, 2008, Ilan, Taiwan.

Kulbak et al., "The eMule Protocol Specification," DANSS Lab, School of Computer Science and Engineering, The Hebrew University of Jerusalem, Jerusalem, Jan. 17, 2005.

Econolite StrongPoint, Mar. 23, 2008. Internet citation downloaded Feb. 19, 2014. http://www.signalcontrol.com/products/econolite/Econolite_StrongPoint.pdf XP 55100983A.

Marin et al., "Nomadic Device Identification and Client Provision for Interaction in a Vehicular Network," IADIS International Conference Wireless Applications and Computing, 2008, pp. 29-37.

* cited by examiner

RENEWABLE RESOURCE DISTRIBUTION MANAGEMENT SYSTEM

This application claims priority pursuant to 35 U.S.C. § 119(e) to U.S. provisional application Ser. No. 61/601,337, filed Feb. 21, 2012, which application is specifically incorporated herein, in its entirety, by reference.

BACKGROUND OF THE INVENTION

1. Field of the Invention

The present invention relates generally to network-based computer services and, more particularly, methods of and systems for managing purchase, sale, and distribution of renewable resources through many, unaffiliated distribution sites.

2. Description of the Related Art

A vehicular revolution has been brewing for decades. Some people studying worldwide supply and demand for fossil fuels have predicted that prices for gasoline will soon top $20 per gallon. In the wake of such predictions, numerous attempts have been made to provide vehicles that use less and less of the increasingly precious fuel. Examples include fully electric cars that run on charged batteries, compressed hydrogen passing through a fuel cell, and compressed-air vehicles.

However, our current infrastructure only supports wide spread distribution of liquid gasoline. Each form of alternative vehicular fuel requires an entirely new distribution infrastructure. For vehicles that would run on compressed hydrogen, a distributed network of hydrogen dispensing stations would be required. For vehicles that would run on compressed air, a distributed network of compressed air would be required. While charging stations for electric vehicles are increasingly available, such stations are few and far between and the notoriously short ranges of electric vehicles requires much greater availability at many more locations.

In addition, electric vehicles that run on batteries often require substantial amounts of time to charge. Accordingly, the quick stop at gas stations that motorists have become accustomed to may not be feasible for rechargeable electric vehicles. Some have proposed battery swap stations at which a rechargeable electric vehicle swaps its entire battery cluster for a fully charged cluster, but again, this would require a major modification to infrastructure.

One obstacle for large scale investment in a new distribution infrastructure for alternative fuels is that it is still not clear which type of alternatively-fueled vehicles will be sufficiently widely adopted to justify such large scale investment. And, the absence of distribution infrastructure for each of the alternative fuels impedes wide adoption of these fuels.

What is needed is an alternative fuel distribution system in which infrastructure can be expanded incrementally with small scale investment.

SUMMARY OF THE INVENTION

In accordance with the present invention, energy resource dispensing terminals can be added one-at-a-time to a wide area resource distribution system in such a way that independent business people are incentivized to participate as distributors. The dispensed energy resource can be generated on-site using no more than grid electricity, water, and/or natural gas or can be gathered locally in the form of waste vegetable oil. Examples of such energy resources include electricity, compressed hydrogen, compressed air, and waste vegetable oil.

The energy dispensing terminal includes a terminal control computer that interacts with customer computing devices, such as personal, portable computing devices or onboard computers installed in vehicles to effect negotiation and fulfillment of energy resource purchase transactions. A resource sharing server facilitates such transactions by maintaining and verifying identities of customers and sellers along with financial account information such that a registered customer can purchase energy resources from any seller registered with the same resource sharing server.

A customer uses location and description data from the resource sharing server to locate a seller of an energy resource of a desired type. It should be appreciated that, due to the resource-type-independence of the described system, energy resources of many different varieties can coexist in a single wide area energy distribution system.

At the energy resource dispensing terminal, the customer's onboard computer establishes a communications link with the terminal control computer. The customer requests dispensing of an amount of the energy resource, e.g., electricity. The terminal control computer uses the resource sharing server to verify that the customer has the ability to pay for the requested amount of electricity and to confirm that the customer is willing to pay the amount.

The terminal control computer controls the energy resource dispensing terminal to dispense the authorized amount of the energy resource, e.g., to charge batteries of an electric vehicle or a plug-in hybrid vehicle.

Thereafter, the terminal control computer effects payment for dispensed amount of the energy resource through the resource sharing server.

Most owners of vehicles that run on next generation energies will have the ability to fuel their own vehicles on-site. For example, an owner of an electric vehicle or a plug-in hybrid vehicle will have a charger on-site to charge the vehicle when not in use. With the addition of a terminal control computer and public access to the charger, such an owner can make electricity available to other owners of similarly-powered vehicles for a price. Whether motivated (i) by profit or (ii) by the desire to have ubiquitous energy availability coupled with the notion that what goes around comes around, new energy resource dispensing terminals can be added where needed as needed.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
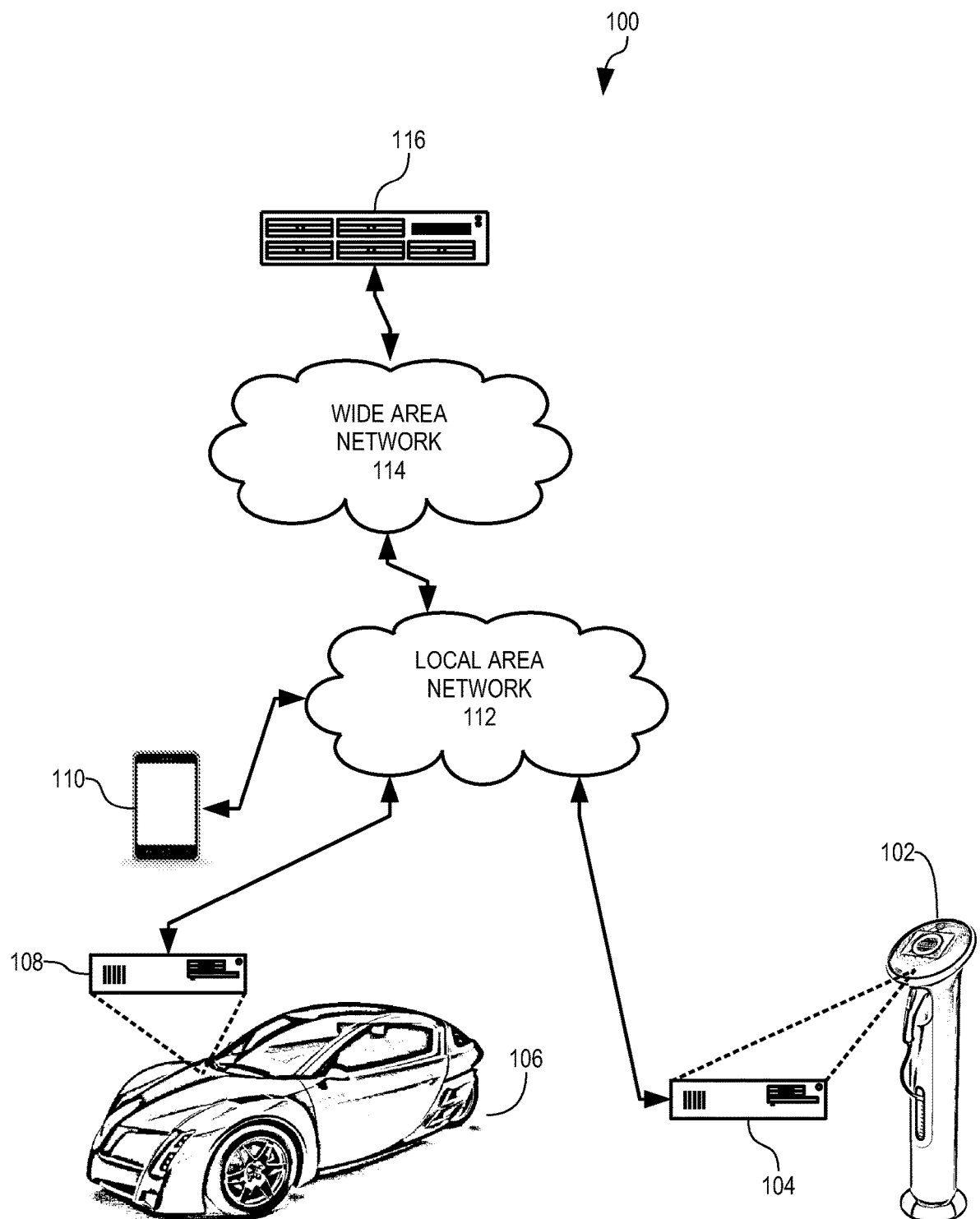
FIG. 1 is a diagram showing a shareable resource distribution terminal, including a terminal control computer; a vehicle that runs on a shareable resource, including an onboard computer; and a personal portable computing device connected to one another through a local area network; and a resource sharing server connected to the local area network through a wide area network. The resource sharing server, the terminal control computer, the onboard computer, and the personal portable computing device cooperate with one another to effect sale and distribution of a shareable resource in accordance with one embodiment of the present invention.

In accordance with the present invention, energy resource dispensing terminals, such as resource dispensing terminal 102 (FIG. 1), can be added one-at-a-time to a wide area resource distribution system at business or residential locations with relative ease. Resource dispensing terminal 102 includes a terminal control computer 104 that cooperates with a resource sharing server 116 and other computing devices to effect sales transactions and to control dispensing of resources through resource dispensing terminal 102.

A computing device of a purchaser, e.g., a personal portable computing device 110 or an onboard computer 108 of a vehicle 106, cooperates with terminal control computer 104 and resource sharing server 116 to request, authorize, and effect the purchase and dispensing of the resource. Vehicle 106 is any vehicle that can consume, and presumable run on, the particular type of resource dispensed by resource dispensing terminal 102. In this illustrative example, the energy resource is electricity so resource dispensing terminal 102 is a charging station for battery-based electric vehicles and vehicle 106 is a battery-based electric vehicle or a plug-in hybrid vehicle. In this illustrative example, vehicle 106 is shown as an Alias electric vehicle under development by ZAP.

Other types of energy resources that can dispensed through a resource dispensing terminal like resource dispensing terminal 102 include compressed hydrogen, compressed air, replaceable battery clusters, and bio-fuels such as waste vegetable oil. Some such energy resources are easily provided by ordinary households, enabling private individuals to add resource dispensing terminals to the overall distribution infrastructure. For example, a charging station can supply electricity from a home. A compressed air dispensing terminal can use household electricity to compress ambient air to be dispensed. A compressed hydrogen dispensing terminal can use electricity from a power grid to extract hydrogen from municipal water or can reform hydrogen from natural gas and can use household electricity to compress the extracted hydrogen for dispensing. People have been collecting waste vegetable oil from restaurants and other sources for decades to run modified diesel engines. Such people, or the restaurants and other direct sources, can make waste vegetable oil available to others.

Figure 2:
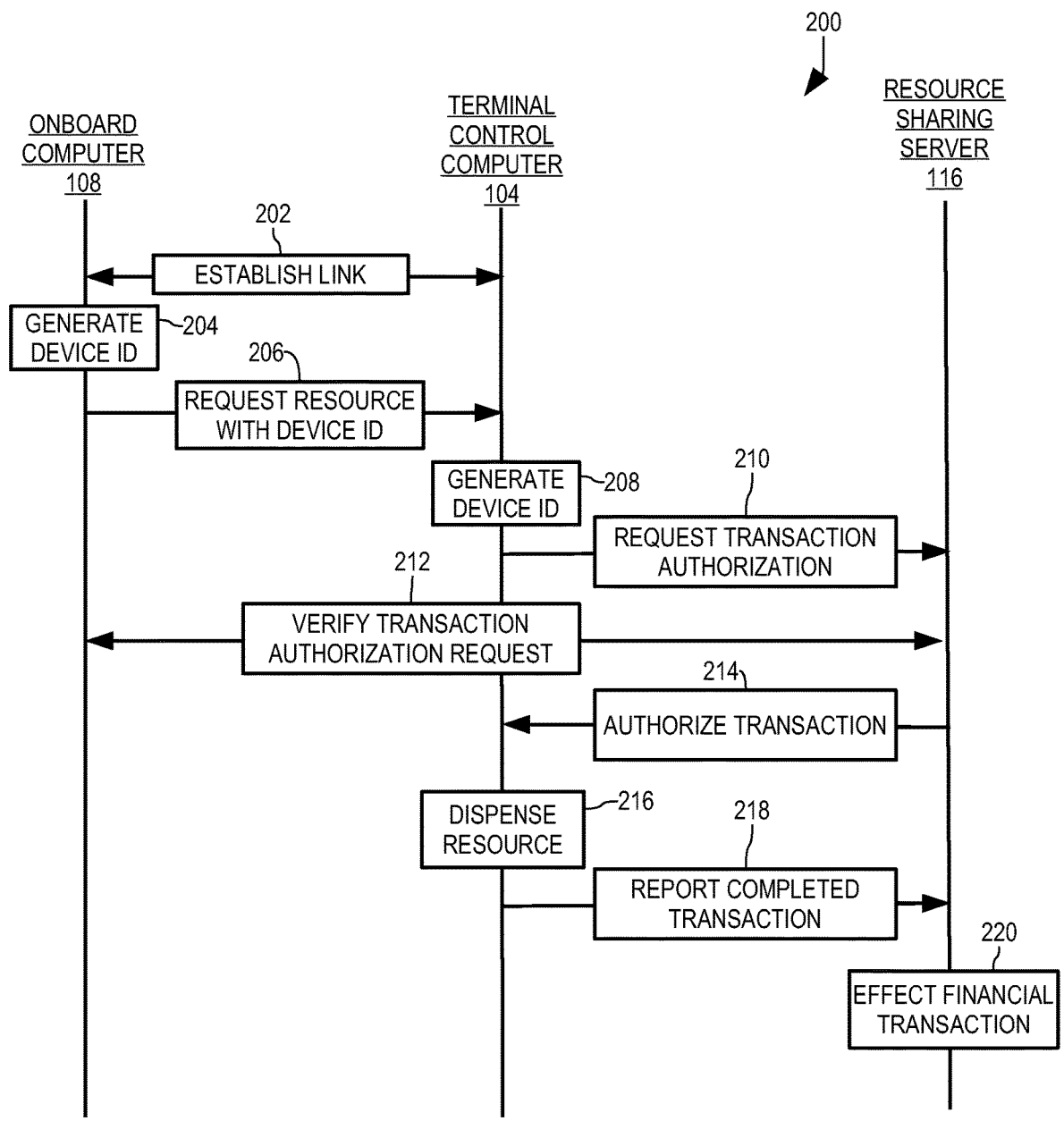
FIG. 2 is a transaction diagram illustrating one embodiment according to the invention of a method by which the resource sharing server, the terminal control computer, the onboard computer, and the personal portable computing device of FIG. 1 cooperate with one another to effect sale and distribution of a shareable resource.

In a manner described in greater detail below in conjunction with transaction flow diagram 200 (FIG. 2), a human customer initiates a transaction with terminal control computer 104 (FIG. 1) through local area network 112 using a computing device, e.g., either onboard computer 108 of vehicle 108 or personal portable computing device 110. The transaction is coordinated by resource sharing server 116 through a wide area network 114, which is the Internet in this illustrative embodiment. In this example, the human customer uses onboard computer 108 to conduct the transaction. Except as otherwise noted herein, conducting the transaction using personal portable computing device 110 is directly analogous.

The human customer's experience begins when the customer becomes interested in refueling vehicle 106. Geographical locations of numerous resource dispensing terminals, including resource dispensing terminal 102, are known to resource sharing server 116 and those locations are made available to the human customer through navigation software executing in onboard computer 108. The human customer drives vehicle 106 to the location of resource dispensing terminal 102.

In step 202 (FIG. 2), onboard computer 108 and terminal control computer 104 cooperate to establish a communications link therebetween through LAN 112. As described more completely below, onboard computer 108, which is shown in greater detail in FIG. 7, includes shareable resource buying logic 720. In this illustrative embodiment, shareable resource buying logic 720 includes a user interface by which the human customer indicates a desire to initiate a resource purchase transaction through physical manipulation of one or more of user input devices 708.

In one embodiment, onboard computer 108 and terminal control computer 104 may establish a communication link, at least in part, through transmission and reception of near-field audio signals in accordance with methods and systems disclosed in U.S. Provisional Application No. 61/595,599 filed Feb. 6, 2012 and fully incorporated herein by reference. For example, a communication link between the two computers may be initiated using wireless electronic communication through LAN 112 (such as a WiFi link). Once initiated, the communication protocol may require completion of an authentication or verification step using near-field audio signals to provide an enhanced layer of security. A source such as a mobile computing device transmits an authentication request by executing the following salient steps using an audio transceiver: scanning a plurality of predetermined frequencies for a free frequency, selecting the free frequency from the plurality of predetermined frequencies, generating a periodic enclosed content message, encoding a carrier wave with the periodic enclosed content message, and transmitting the modulated carrier wave at the free frequency. The audio transceiver, in one example, may be a mobile phone having both a speaker and a microphone. The periodic enclosed content message includes an enclosed content message at each period. The enclosed content message comprises a beginning indication, a content, and an ending indication. The beginning indication indicates when the enclosed content message begins, while the ending indication indicates when the enclosed content ends. This allows for verification that the enclosed content message is completely instead of partially received. Furthermore, the content can include biometric data or device identification data, or both, which can be used to authenticate the user or the mobile computing device. Furthermore, the content may also include financial information for the user, or other data which might be used for gaining access to a secure network for facilitating a transaction once the user or the mobile computing device, or both, have been authenticated. In general, the device fingerprint comprises a bit string or bit array that includes or is derived from user-configurable and non-user-configurable data specific to the audio transceiver computing device. Non-user-configurable data includes data such as hardware component model numbers, serial numbers, and version numbers, and hardware component parameters such as processor speed, voltage, current, signaling, and clock specifications. User-configurable data includes data such as registry entries, application usage data, file list information, and MAC address. In an embodiment, the audio transceiver computing device can also include, for example, manufacture name, model name, and/or device type of the audio transceiver computing device. In an exemplary embodiment, the modulated carrier wave 106 can be, for example, a sound wave.

Figure 6:
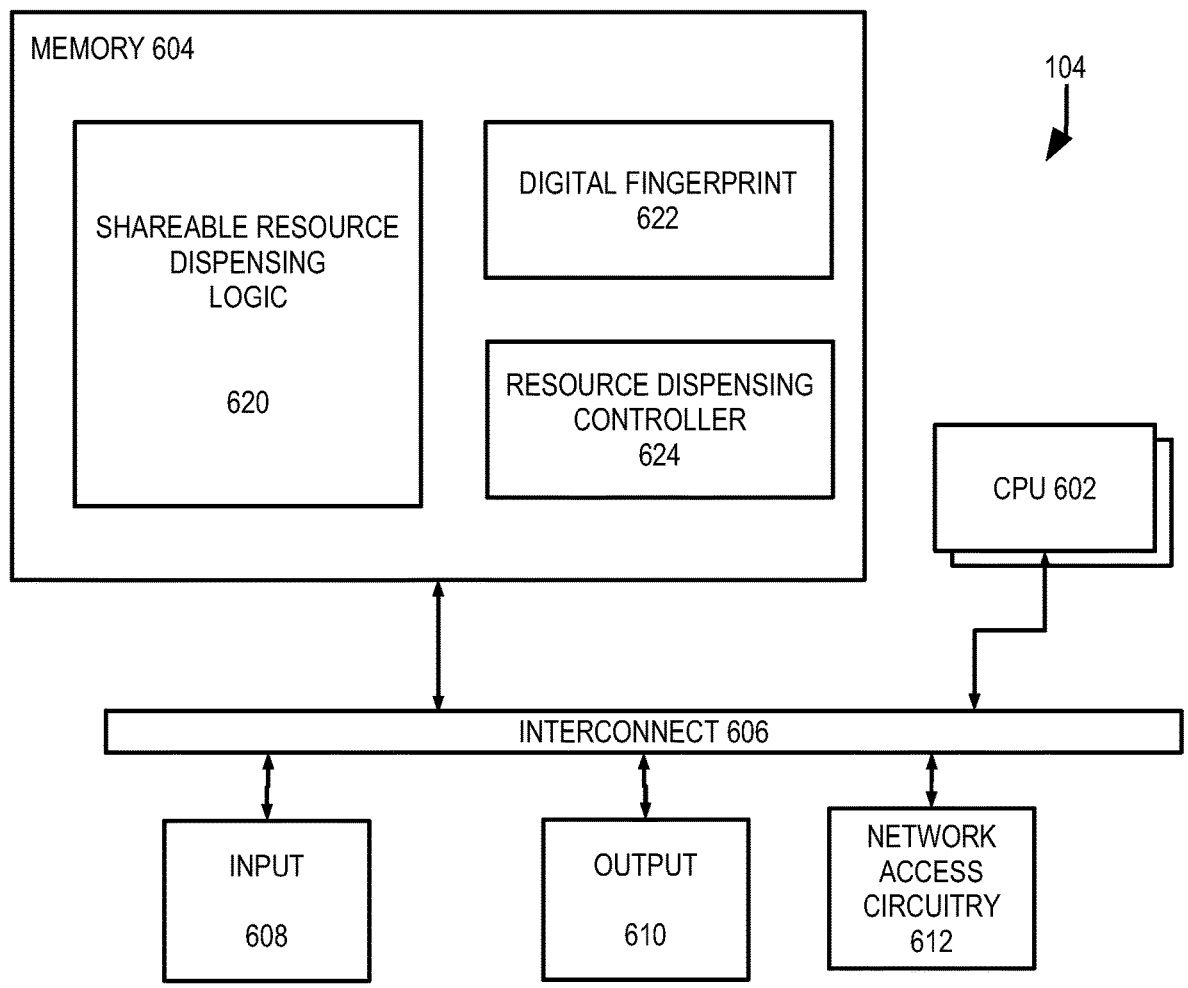
FIG. 6 is a block diagram showing the onboard computer of FIG. 1 in greater detail.

Terminal control computer 104, which is shown in greater detail in FIG. 6, includes shareable resource dispensing logic 620. Shareable resource dispensing logic 620 is configured to accept connections through a local area network in a predetermined manner that is known to shareable resource buying logic 720. For example, shareable resource dispensing logic 620 can be configured to accept network connections on a predetermined port, to accept Bluetooth® connections with a predetermined 4-digit code, or to include a web server with a predetermined behavior. In each respective example, shareable resource buying logic 720 is preconfigured to know and use the predetermined port, the predetermined 4-digit code, or the predetermined behavior.

In step 204 (FIG. 2), shareable resource buying logic 720 of onboard computer 108 generates an identifier for onboard computer 108. In this illustrative embodiment, the identifier is a digital fingerprint 722 (FIG. 7) of onboard computer 108. Digital fingerprints and their generation are known and are described, e.g., in U.S. Pat. No. 5,490,216 (sometimes referred to herein as the '216 Patent), and in related U.S. Patent Application Publications 2007/0143073, 2007/0126550, 2011/0093920, and 2011/0093701 (the "related applications"), the descriptions of which are fully incorporated herein by reference. Digital fingerprint 722 is a unique identifier of onboard computer 108 that is not easily spoofed or reverse engineered.

In step 206 (FIG. 2), shareable resource buying logic 720 forms a request for the resource dispensed by resource dispensing terminal 102 and sends the request, including the identifier of onboard computer 108, to terminal control computer 104. It is preferred that the identifier of onboard computer 108 is not readily obtainable by monitoring LAN 112. For example, the link between onboard computer 108 and terminal control computer 104 can be a secure channel, the identifier of onboard computer 108 can be encrypted, or terminal control computer 104 can specify a specific, variable format for the identifier such that the identifier of onboard computer 104 varies from transaction to transaction.

Figure 7:
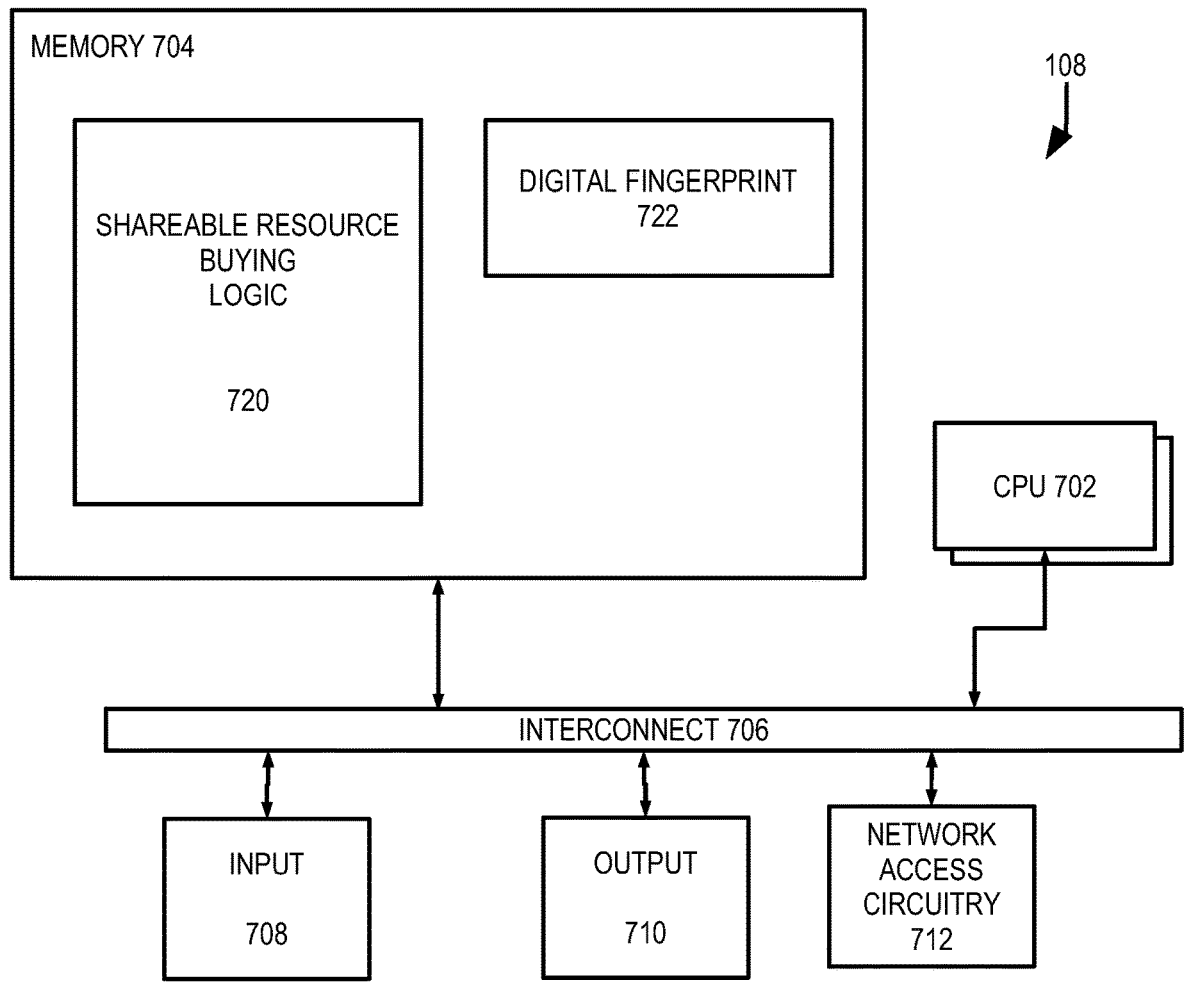
FIG. 7 is a block diagram showing the terminal control computer of FIG. 1 in greater detail.

In response to the message sent by shareable resource buying logic 720, shareable resource dispensing logic 620 generates an identifier for terminal control computer 104 in step 208 and sends an authorization request for the transaction, including identifiers of onboard computer 104 and terminal control computer 104, to resource sharing server 116 in step 210. In this illustrative embodiment, the identifier of terminal control computer 104 is a digital fingerprint 722 (FIG. 7). By sending the authorization request, shareable resource dispensing logic 620 determines the amount of energy resources to be dispensed is no greater than the amount originally requested, the maximum amount for which the customer can pay, and an amount confirmed by the customer because resource sharing server 116 verifies these amounts as described below.

Figure 5:
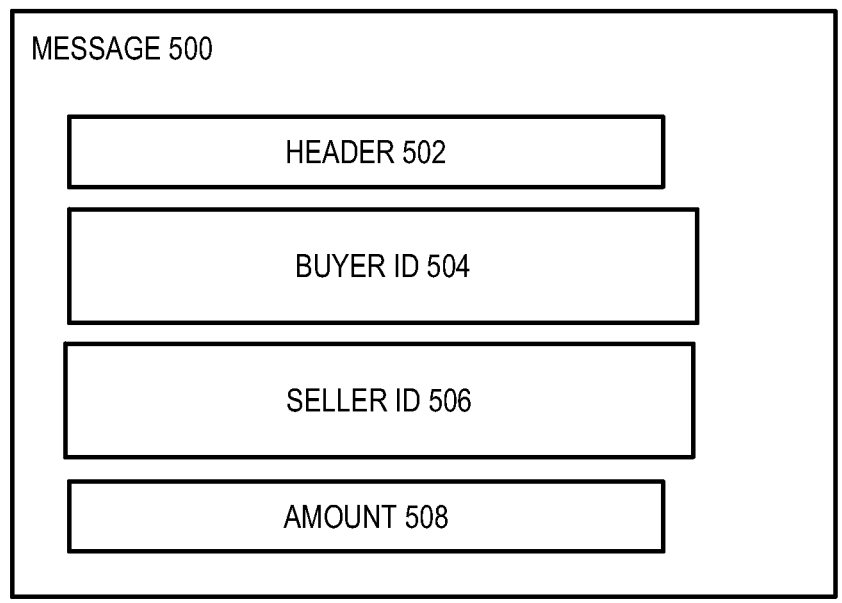
FIG. 5 is a block diagram of a message used by the resource sharing server, the terminal control computer, the onboard computer, and the personal portable computing device of FIG. 1 to cooperate with one another to effect sale and distribution of a shareable resource.

In this illustrative embodiment, the authorization request is in the form of a message 500 (FIG. 5). Message 500 includes a header 502 that indicates a type of message 500. In this illustrative embodiment, the message can be an authorization request, an authorization, or a report. Buyer identifier 504 is an identifier of the computing device buying the resource. Seller identifier 506 is an identifier of the terminal control computer selling and dispensing the resource. Amount 508 is data representing an amount of the resource to be dispensed.

Thus, after step 210 (FIG. 2) and receipt of message 500 (FIG. 5) requesting authorization of the transaction, resource sharing server logic 820 (FIG. 8) of resource sharing server 116 knows the intended buyer and the intended seller and a proposed amount of the resource to be sold.

Figure 3:
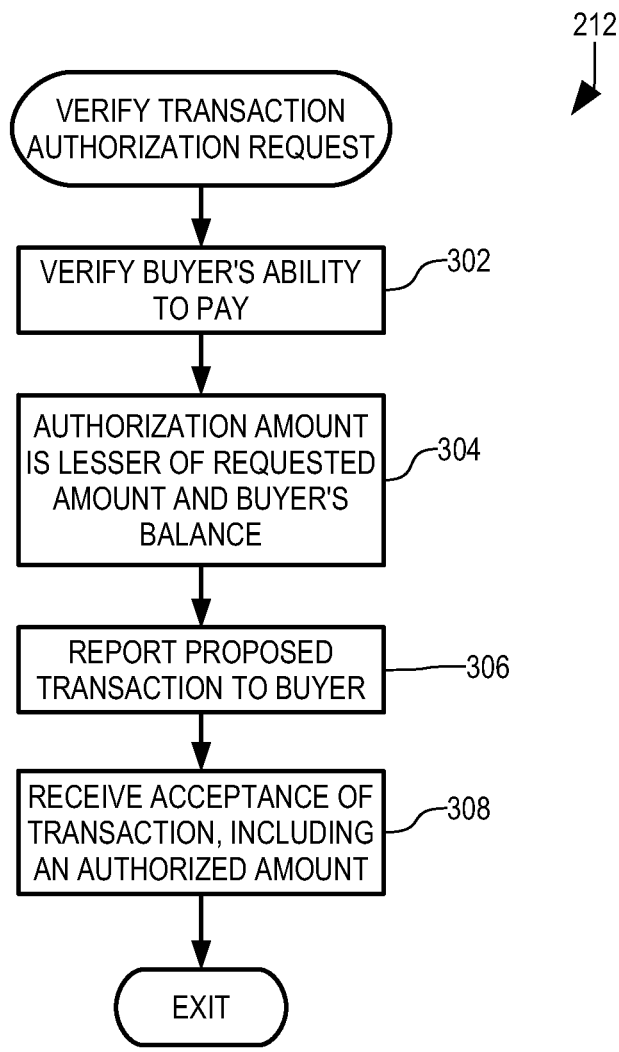
FIG. 3 is a logic flow diagram illustrating a step of the transaction flow diagram of FIG. 2 in greater detail.

In step 212 (FIG. 2), resource sharing server logic 820 verifies the transaction authorization request with shareable resource buying logic 720 of onboard computer 108. Step 212 is shown in greater detail as logic flow diagram 212 (FIG. 3).

In step 302, resource sharing server logic 820 verifies the ability of onboard computer 108 to pay for the proposed transaction.

Figure 4:
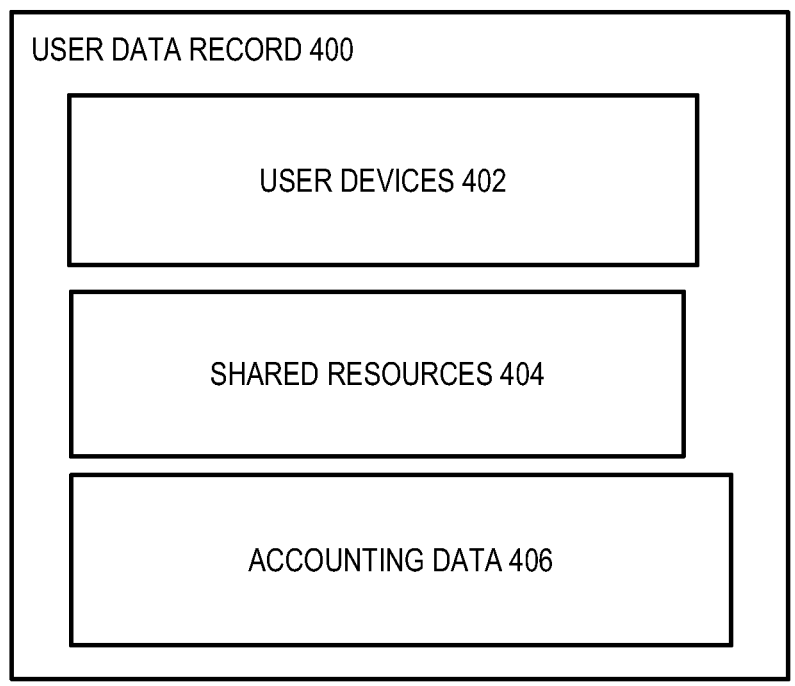
FIG. 4 is a block diagram of a user data record used by the resource sharing server of FIG. 1 to manage sale and distribution of a shareable resource.

As described below, resource sharing server 116 includes user data 824 representing known users of the resource sharing system described herein. For each such user, user data 824 includes a user data record such as user data record 400 (FIG. 4).

User data record 400 includes user devices 402, which includes data specifying one or more identifiers of computing devices associated with a given user. The computing devices can be devices used to purchase resources or terminal control computers used to sell and dispense resources.

User data record 400 also includes shared resources 404. Shared resources 404 include data specifying one or more resources offered by the given user, including the particular type of resource offered and the geological location of each. The type and location of shared resources 404 are publicly available for use with navigation software and devices of potential customers.

Accounting data 406 of user data record 400 includes financial account data by which resource sharing server logic 820 can effect purchases and sales. In one embodiment, each user prepays the owning entity of resource sharing server 116 and the amounts prepaid are represented in accounting data 406 and are adjusted as transactions are completed. In an alternative embodiment, accounting data 406 includes data specifying one or more payment methods such as credit cards, debit cards, and bank accounts and resource sharing server logic 820 effects payment through third-party financial servers using the payment methods. In another alternative embodiment, both prepayment and payment methods are implemented and offered to users.

To verify the buyer's ability to pay in step 302 (FIG. 3), resource sharing logic 820 retrieves the user data record 400 that includes digital fingerprint 722 in user device 402 and uses accounting data 406 to determine that the human customer has the ability to pay the requested amount of the proposed transaction. The requested amount of the proposed transaction is represented by amount 508 (FIG. 5) of the authorization request message.

In step 304 (FIG. 3), resource sharing server logic 820 determines an amount to authorize for the proposed transaction as the lesser of the requested amount and the human customer's available balance.

In step 306, resource sharing server logic 820 reports the proposed transaction to shareable resource buying logic 720 (FIG. 7) of onboard computer 108. Shareable resource buying logic 720 includes a user interface that displays the proposed transaction to the human customer and accepts signals generated by physical manipulation of user input devices 708 to indicate acceptance or rejection of the proposed transaction. By requiring confirming acceptance of the proposed transaction by the human customer, resource sharing server logic 820 prevents unscrupulous sellers of resources from spoofing sales. In one embodiment, the user interface of shareable resource buying logic 720 allows the human customer to specify an amount of the transaction that is less than the proposed amount.

In step 308 (FIG. 3), resource sharing server logic 820 receives data from shareable resource buying logic 720 indicating acceptance or rejection of the proposed transaction and, in some embodiments, the amount accepted. After step 308, processing according to logic flow diagram 212, and therefore step 212 (FIG. 2), completes.

In step 214, resource sharing server logic 820 authorizes the transaction by sending terminal control computer 104 a message 500 (FIG. 5) with a header 502 that indicates that the message is an authorization, a buyer identifier 504 that identifies onboard computer 108 as the purchaser, a seller identifier 506 that identifies terminal control computer 104 as the seller, and an amount 508 that specifies an amount of resource that the buyer can and has agreed to pay.

In response to the authorization of step 214 (FIG. 2), shareable resource dispensing logic 620 causes resource dispensing controller 624 to control dispensing of the resource through resource dispensing terminal 102 up to the authorized amount in step 216. If the human customer has not yet done so, the human customer physically couples resource dispensing terminal 102 (FIG. 1) to vehicle 106 such that vehicle 106 can receive the resource from resource dispensing terminal 102. In this illustrative example, the human customer inserts a charging paddle of resource dispensing terminal 102 into a charge port of vehicle 106.

During dispensing of step 216 (FIG. 2), resource dispensing control 624 (FIG. 6) monitors the amount of resources dispensed. Upon completion of step 216, indicated perhaps by the replacing of the charging paddle into its proper position in resource dispensing terminal 102 or otherwise disconnecting vehicle 106 from resource dispensing terminal 102, resource dispensing controller 624 reports to shareable resource dispensing logic 620 the amount of resource actually dispensed in step 216. The amount actually dispensed can be less than the authorized amount.

In step 218 (FIG. 2), shareable resource dispensing logic 620 reports the complete dispensing to effect the transfer of funds. The report is in the form of a message 500 (FIG. 5) in which header 502 indicates that the message is a report of a completed transaction, buyer identifier 504 identifies onboard computer 108 as the purchaser, seller identifier 506 identifies terminal control computer 104 as the seller, and amount 508 specifies the amount of resource actually dispensed. In an alternative embodiment, onboard computer 108 also reports the completed transaction to resource sharing server 116, facilitating fraud detection by resource sharing server 116.

In step 220 (FIG. 2), resource sharing server logic 820 effects payment for the completed transaction by removing funds from at least one financial account of the human customer and adding the funds to at least one financial account of the user associated with terminal control computer 104. In some embodiments, resource sharing server logic 820 immediately reports the completed transaction and effecting of payment to onboard computer 108 and terminal control computer 104. In alternative embodiments, resource sharing server 116 provides an interface by which each user can review their account transactions at a later time.

The customer's experience is very convenient. The customer uses conventional navigation software, that executes within onboard computer 108 and in which waypoints have been added for resources managed through resource sharing server 116, to locate and navigate to a convenient charging station. At the charging station, the customer uses onboard computer 108 to initiate a purchase of electricity from the charging station and to confirm the purchase. With the charging paddle inserted in the charge port of vehicle 106, vehicle 106 is charged up to the authorized and confirmed amount of energy transferred. The customer's experience is very much like the conventional experience at a gas station to refuel a car.

The seller's experience is also very convenient. If the seller has an electric or a plug-in hybrid vehicle, the seller has likely already purchased and installed a charging station at the seller's residence or business. The seller can install the charging station at a convenient location for customers, such as adjacent to a driveway or curb. Once installed, the operation of the resource distribution terminal is completely "hands-off", except for perhaps periodic maintenance of the terminal.

The invention is designed for the convenience of consumers, so that they may cooperate with other consumers who use the same form of energy to fuel their vehicles. In this respect, any consumer who would otherwise participate only as a customer can also participate as a seller in a vast cooperative. The invention will advantageously lower the transactional costs of energy distribution, as the need for constructing specialized charging stations will be minimized, along with the overhead costs of their operation. Deployment of cooperative charging stations according to the invention throughout existing residential and commercial developments will lower the average operating cost of a vehicle per mile, and in this sense improve energy efficiency in the aggregate.

Small businesses can install charging stations or other resource dispensing terminals in their parking lots to attract customers with charging convenience. Consider an out-of-the-way restaurant or other tourist attraction such as a winery located at a distance from a densely populated region that is just under the full range of an electric vehicle or the electric-only range of a plug-in hybrid vehicle. The ability to recharge while dining or touring can offer a significant advantage over competitors in the minds of people for whom electrical vehicle range is a significant consideration.

Another advantage is the resource-independence. If someone owns a vehicle that runs on compressed air, a compressed air dispensing terminal can be constructed and operated in the manner described above. The same is true for vehicles that run on compressed hydrogen, waste vegetable oil, or other resources. If someone can produce fuel for their own vehicle, they can make that fuel available to others using a system such as that described herein. And, all such resource dispensing terminals can peacefully coexist. In effect, such a fuel distribution system can accommodate nearly any and all forms of vehicle fuel.

Terminal control computer 104 is shown in greater detail in FIG. 6. Terminal control computer 104 includes one or more microprocessors 602 (collectively referred to as CPU 602) that retrieve data and/or instructions from memory 604 and execute retrieved instructions in a conventional manner. Memory 604 can include generally any computer-readable medium including, for example, persistent memory such as magnetic and/or optical disks, ROM, and PROM and volatile memory such as RAM.

CPU 602 and memory 604 are connected to one another through a conventional interconnect 606, which is a bus in this illustrative embodiment and which connects CPU 602 and memory 604 to one or more input devices 608, output devices 610, and network access circuitry 612. Input devices 608 can include, for example, a keyboard, a keypad, a touch-sensitive screen, a mouse, a microphone, and one or more cameras. Output devices 610 can include, for example, a display—such as a liquid crystal display (LCD)—and one or more loudspeakers. Network access circuitry 612 sends and receives data through computer networks such as local area network 112 (FIG. 1), the Internet, and mobile device data networks, for example. In some embodiments, input devices 608 and output devices 610 can be omitted.

A number of components of terminal control computer 104 are stored in memory 604. In particular, shareable resource dispensing logic 620 and resource dispensing controller 624 are each all or part of one or more computer processes executing within CPU 602 from memory 604 in this illustrative embodiment but can also be implemented using digital logic circuitry. As used herein, "logic" refers to (i) logic implemented as computer instructions and/or data within one or more computer processes and/or (ii) logic implemented in electronic circuitry. Digital fingerprint 622 is data stored persistently in memory 604.

Onboard computer 108 is shown in greater detail in FIG. 7. Onboard computer 108 includes one or more microprocessors 702 (collectively referred to as CPU 702), memory 704, an interconnect 706, input devices 708, output devices 710, network access circuitry 712 that are directly analogous to CPU 602 (FIG. 6), memory 604, an interconnect 606, input devices 608, output devices 610, network access circuitry 612, respectively. Network access circuitry 712 sends and receives data through computer networks such as local area network 112 (FIG. 1), the Internet, and the public-switched telephone network (PSTN), for example.

A number of components of onboard computer 108 are stored in memory 704. In particular, shareable resource buying logic 720 is all or part of one or more computer processes executing within CPU 702 from memory 704 in this illustrative embodiment but can also be implemented using digital logic circuitry. Digital fingerprint 722 is data stored persistently in memory 704.

Figure 8:
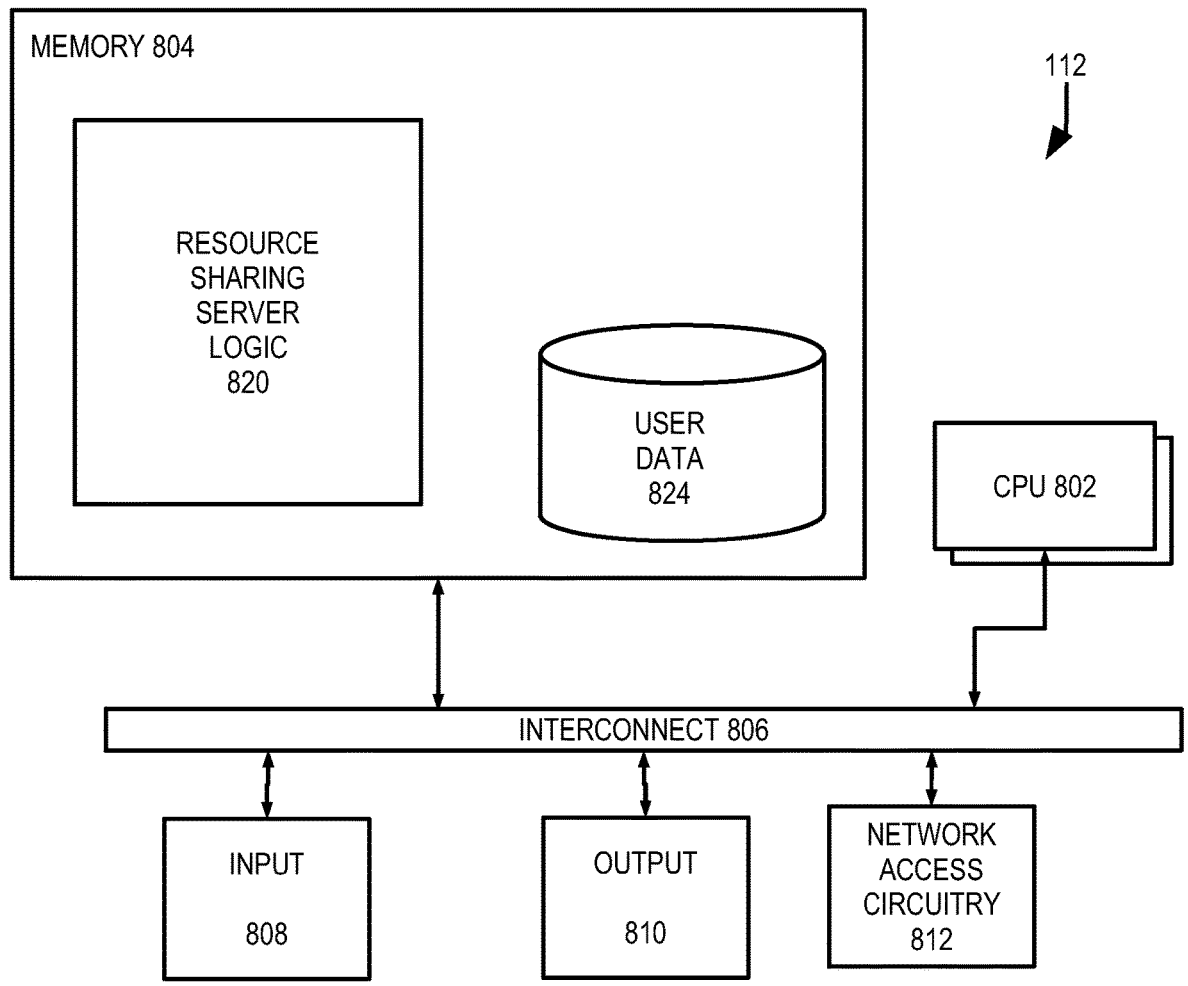
FIG. 8 is a block diagram showing the resource sharing server of FIG. 1 in greater detail.

Resource sharing server 116 is shown in greater detail in FIG. 8. Resource sharing server 116 includes one or more microprocessors 802 (collectively referred to as CPU 802), memory 804, an interconnect 806, input devices 808, output devices 810, network access circuitry 812 that are directly analogous to CPU 602 (FIG. 6), memory 604, an interconnect 606, input devices 608, output devices 610, network access circuitry 612, respectively. As resource sharing server 116 (FIG. 8) is a server computer, input devices 808 and output devices 810 can be omitted.

A number of components of resource sharing server 112 are stored in memory 804. In particular, resource sharing server logic 820 is all or part of one or more computer processes executing within CPU 802 from memory 804 in this illustrative embodiment but can also be implemented using digital logic circuitry. User data 824 is data stored persistently in memory 604. In this illustrative embodiment, user data 824 is organized as one or more databases.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A renewable resource management system configured for dispensing and conducting an energy resource transaction, comprising a customer computing device and a resource management terminal control computer, the renewable resource management system configured with executable instructions for:

authenticating the energy resource dispensing transaction on condition that the customer computing device establish (i) a first communication link through a local area network with a terminal control computer of the resource dispenser and (ii) a second communication link that requires transmission and reception of near-field audio signals between the customer computing device and the terminal control computer;

receiving a request for dispensing of an energy resource from the customer computing device, wherein the request includes a requested amount and a customer computing device identifier, wherein the customer computing device identifier comprises a digital fingerprint;

retrieving customer data that is stored prior to creation of the request and that associates the customer computing device identifier with one or more customer financial accounts;

determining that the one or more customer financial accounts that are associated with the customer computing device have funds of at least the cost of a proposed amount of the energy resource;

causing a resource dispenser to dispense the energy resource in a dispensed amount that is no greater than the proposed amount;

effecting transfer of funds from the one or more customer financial accounts to one or more seller financial accounts associated with the resource dispenser, wherein the funds correspond to the cost of the dispensed amount of the energy resource;

wherein the transmission of near field audio signals is accomplished by:
  scanning a plurality of predetermined frequencies for a free frequency;
  selecting the free frequency from the plurality of predetermined frequencies;
  generating a periodic enclosed content message;
  generating a modulated carrier wave representing the periodic enclosed content message; and
  transmitting the modulated carrier wave at the free frequency;
  wherein each period of the periodic enclosed content message includes a begin indication, a content, and an end indication;

wherein the content includes device identification data including a bit array derived from user-configurable and non-user-configurable data specific to the customer computing device; and wherein the modulated carrier wave comprises a sound wave.

2. The system of claim 1, wherein the modulated carrier wave is modulated for a predetermined number of periods, or a predetermined period of time.

3. The system of claim 1, wherein the modulated carrier wave is transmitted until a stop indication is received from a user.

4. The system of claim 1, wherein the modulated carrier wave is modulated by the periodic enclosed content message.

* * * * *